United States Patent [19]

Goodwin

[11] 4,051,114

[45] Sept. 27, 1977

[54] VEGETABLE PROTEIN ISOLATE AND METHOD OF PRODUCING SAME

[75] Inventor: William D. Goodwin, Atlanta, Ga.

[73] Assignee: Introtech, Washington, D.C.

[21] Appl. No.: 576,974

[22] Filed: May 13, 1975

[51] Int. Cl.² .............................................. A23J 1/14
[52] U.S. Cl. ................................................ 260/123.5
[58] Field of Search ............... 260/112 R, 112 B, 118, 260/120, 122, 123.5

[56] References Cited

U.S. PATENT DOCUMENTS

| | | | |
|---|---|---|---|
| 3,758,452 | 9/1973 | Owen | 260/123.5 |
| 3,965,086 | 6/1976 | Swain | 260/123.5 |

*Primary Examiner*—Paul R. Michl
*Attorney, Agent, or Firm*—Edmund M. Jaskiewicz

[57] ABSTRACT

A mixture of crushed vegetable protein and water is subjected to ultra-sonic energy. N,N, dimethylformamide is subsequently added to the mixture and the resulting mixture refluxed at boiling temperature for about one (1) hour to solubilize and extract the protein composition which is then recovered from the extract.

7 Claims, No Drawings

VEGETABLE PROTEIN ISOLATE AND METHOD OF PRODUCING SAME

The present invention relates to the solubilization of vegetable or globular protein from its source, and recover a protein composition or concentrate suitable in itself as a food or for incorporation into food products. Rapeseed is a suitable source of globular or vegetable protein.

Rape, the source of oil-yielding rapeseed is cultivated in many countries. Most of the cultivated varieties belong either to Brassica napus or B. campestris. B. napus is a glaucous plant with elongate narrow seed pods.

It has been known to process various vegetable protein sources in order to extract a protein therefrom which might be suitable both for human consumption and for animal feed. One such source is rapeseed (brassica napus) from which rapeseed protein concentrate (RPC) has been prepared using food processing practices. The concentrate is produced from fully ripened high-quality rapeseeds that have been thoroughly cleaned to remove foreign material and damaged seeds. Rapeseed itself is produced in great quantities and has been used for centuries as a food and cereal grass. While rapeseed grows in numerous countries it is noted that the preponderance of rapeseed is produced in Canada, Sweden, France and India.

The rapeseed protein concentrate of this invention contains a high percentage of essential amino acids e.g. such as found in food proteins. The oil extracted from rapeseed, for example, has found wide use as a lubricant in ine mechanisms but such oil, per se, is objectionable as an edible substance since the oil contains lignoceric acid which is toxic.

A process has been proposed to produce protein from rapeseed by cracking of the rapeseed to remove the meat from the seed and then subjecting the meats to enzymatic hydrolysis. The glucosinolates were then removed by water extraction together with other anti-nutritional substances. The resultant seed meats were then dried and the oil removed from the dried material by solvent extraction. This process resulted in a yield of up to about 30% and the protein concentrate contained about 65% protein.

This process, however, has the disadvantage that the steps which are required are complicated and, accordingly, the entire process is too expensive. The step of cracking the seed, removing of the shell or seed coat and then separating the meat of the seed contributed significantly to the cost and complexity of such a process.

In accordance with the present invention there is provided a novel process for producing an edible protein from vegetable sources by solubilization and extraction. Vegetables and plants contain what is scientifically classified as globular proteins. Such proteins are soluble in aqueous solvents in contrast to fibrous proteins which are generally insoluble in water, salt solutions, dilute acid, or alkali.

While the present invention will be described with respect to the treatment of rapeseed and the like vegetable seed sources, other vegetable and plant protein substances may be utilized in practicing the invention.

In carrying out the process of this invention, the vegetable or globular protein source is crushed or masticated and then admixed with water. When the protein source consists of seeds, e.g. rapeseed, the seeds are merely crushed and there is no initial separation of meat from the seed coats or oily constituents. Thereafter the mixture of crushed vegetable matter and water is subjected to intense agitation, preferably by treatment of the mixture with ultra-sonic energy vibrations. The water admixed with the protein source is initially at room temperature (i.e. 20° C) although the temperature of the water may increase somewhat while subjected to ultra-sonic energy. Subsequently, N,N, dimethylformamide (DMF) is added so that the DMF content of the entire mixture is approximately 75%. The mixture is then refluxed at about the boiling point of DMF for a sufficient period of time to solubilize and extract the protein composition. The resulting product is substantially a clear liquid consisting of DMF, water and the vegetable protein which is then treated with a polar solvent, such as ethyl alcohol, methylene chloride, acetone or di-methyl ether and the protein is precipitated out as a white flocculent precipitate which may be then filtered off and can then be dried into a powder, if desired.

N,N,dimethylformamide is a liquid having a boiling temperature of 153° C; sp.gr. 0.945. It is miscible with water, and has been used heretofore principally as a solvent for polymeric materials. So far as known it has not been used, prior to the present invention, as a medium for the solubilization of proteinaceous materials. In fact, both casein and gelatin are reported to be insoluble in DMF. Accordingly, it was surprising and unexpected to discover that dimethylformamide and its aqueous solutions act as a solvent of vegetable protein and other plant protein sources which is of primary nutrient value.

The DMF may be employed in 100% concentration or in admixture with water to an amount such that the total DMF composition of the mixture of vegetable protein source, water and DMF is about 75%.

The solubilization may be performed in atmospheric or superatmospheric pressure but preferably it is carried out at atmospheric presure which is one of the advantages of the process of the invention. The temperature of the extraction will generally correspond to the chosen pressure but for the purposes of the present invention the extraction is preferably carried out with boiling DMF or DMF solution at atmospheric pressure.

Upon completion of the solubilization, the resultant mixture comprises undissolved residue, with a clear layer consisting of DMF, water and protein, and floating on top of the mass, a layer of oily material.

The ultra-sonic energy is applied to the mixture of vegetable protein and water for about 90 seconds and is maintained under a pressure of 40 psi (gauge). 300 watts of energy were generated at the tip of the horn and at a frequency of 20,000 cycles per second (20kHz). The transducer used was made by Branson Sonic Power, a Division of Smith, Kline and French Laboratories. Other equipment such as disintegrators or blenders to provide for gelsol transition might be used instead of ultra-sonic energy-producing equipment, and such as to produce high intensity agitation.

According to the present process about 75% of the protein in the vegetable protein source is solubilized and simultaneously any oily matter is separated. The extracted protein is in the form which may be termed a plant protein isolate and represents a yield of between 55–65%. The yield of oil is about 35–40% when rapeseed is used as the vegetable protein source. The resultant product has a protein content of 95–96%.

The essential amino acid composition of the vegetable protein such as produced by the present process is shown as follows:

ESSENTIAL AMINO ACID COMPOSITION

| Amino acid (g/16gN) | RPC | Defatted soybean flour (1) | FAO reference protein (1957) |
|---|---|---|---|
| Isoleucine | 4.1 | 4.4–4.9 | 4.2 |
| Leucine | 7.5 | 7.2–7.9 | 4.8 |
| Lysine | 6.0* | 5.4–6.7 | 4.2 |
| Phenylalanine | 4.1 | 4.6–5.4 | 2.8 |
| Tryosine | 2.8 | 3.4–3.8 | 2.8 |
| Cystine | 3.1** | 0.8–1.6 | 2.0 |
| Methionine | 2.0 | 1.2–1.5 | 2.2 |
| Threonine | 4.4 | 3.6–4.2 | 2.8 |
| Valine | 5.2 | 4.0–5.2 | 4.2 |
| Tryptophan | 1.6 | 0.9–1.4 | 1.4 |

The protein product produced in accordance with this invention is 100% digestible and is non-toxic. The protein is stable and is completely free from any offensive odors when used in food. The product is stable and does not develop any off-flavors or odors or deterioration of protein quality when stored in a moisture, vapor-proof packaging material for six months at a temperature at about 40° C. Storage conditions are preferably such that direct heat is avoided and the packaging material used should be such so as to withstand all of the stresses of normal handling during storage and shipment.

The functional properties of the vegetable protein especially when using rapeseed as the vegetable protein source are extremely favorable and one of the most striking properties being its high water-binding capacity and its freedom from off-flavors when used in foods.

The water absorption capacity of the protein product is 500–700% as compared to 400% for texturized soybean flour and its water-binding capacity is 300–400% as compared to 200% for such a texturized soybean flour. The protein product of the invention can be used at 2-3 times greater concentration than soybean protein in different foods without any detectable off-flavors. The solubility of the protein in the product of this invention is low comparable to that of heat-treated soybean products and the emulsifying and foaming properties are the same as for those products.

The protein product as described is bland, having no readily discernable taste or odor and is light tan in color when in the form of a dry powder.

The protein composition of the present invention is useful as a supplement to food materials to improve their nutritional value. The protein product of the invention can also be used directly as a protein source by forming the dry powder into tablets, wafers and the like for consumption by humans and animals or as a feed additive for veterinarian use. The protein product further, may be added to candy to balance the protein value of candy.

Other vegetable protein-containing substances besides rapeseed which may be processed according to the present invention to produce the protein product include, but are not limited to alfalfa, peanut hay, rapeseed hay, peanuts, wheat germs, pecans and nuts in general, soybeans, and acorns.

The following examples wherein all parts are by weight, unless otherwise stated illustrate the practice of the present invention but are not to be regarded as limiting:

EXAMPLE I 25 grams of crushed rapeseed are mixed with 70 grams of water at room temperature and the resulting mixture subjected to ultra-sonic energy under 40 psi (gauge) for 90 seconds, the energy being at about 300 watts and at a frequency at about 20,000 [Herz] (20 kHz)·210 grams DMF are then added and the resulting mixture is refluxed at atmospheric pressure at 105° C for about one (1) hour. Insoluble residue is then removed by centrifugation and the rapeseed oil is removed by a centrifuge having a phase separator The remaining clear liquid consists of DMF, water and protein to which was added an approximately equal volume of ethyl alcohol to remove the protein as a white flocculent precipitate as aforementioned. The protein precipitate was then filtered and centrifuged successively three (3) times and washed with ethyl alcohol. The last washing was with ether which sublimed to dry the precipitate. The yield of protein precipitate was 16.25 grams.

EXAMPLE II

The process of Example I but using 2 grams of rapeseed, 167 grams of DMF and 55 grams of water which yielded 1.3 grams of protein.

EXAMPLE III

The process of FIG. 1 and using 100 grams of rapeseed, 280 grams of water and 900 grams of DMF to yield 65 grams of protein.

EXAMPLE IV

The process of FIG. 1 with 75 grams of rapeseed, 120 grams of water and 370 grams of DMF to yield 48.75 grams of protein.

What is claimed is:

1. A process for producing a protein composition from rapeseed which is crushed and admixed with water, subjecting the mixture of rapeseed substance admixed with water to high intensity agitation, refluxing the resultant mixture with N,N, dimethylformamide (DMF) for a sufficient time to solubilize and extract the protein from the mixture, and thereafter recovering the protein therefrom.

2. A process as in claim 1 wherein the high intensity agitation comprises ultra-sonic energy.

3. A process as in claim 1 wherein the refluxing is carried out at about 105° C.

4. A process as claimed in claim 3 wherein the refluxing is carried out for about one hour.

5. A process as claimed in claim 2 wherein ultra-sonic energy is applied for about 90 seconds.

6. A process as claimed in claim 2 wherein a mixture of crushed rapeseed and water is subjected to a pressure of about 40 psi during the application of said ultra-sonic energy.

7. A process as claimed in claim 1 wherein the amount of DMF supplied is such as to consist of 75% of the total mixture.